United States Patent [19]
Cooper et al.

[11] Patent Number: 5,680,223
[45] Date of Patent: *Oct. 21, 1997

[54] METHOD AND SYSTEM FOR LABELING A DOCUMENT FOR STORAGE, MANIPULATION, AND RETRIEVAL

[75] Inventors: Martin F. N. Cooper, Fremont; Walter A. L. Johnson, Santa Clara; Dick Wah Lo, Milpitas; Z. Erol Smith, III, Palo Alto, all of Calif.

[73] Assignee: Xerox Corporation, Stamford, Conn

[*] Notice: The term of this patent shall not extend beyond the expiration date of Pat. No. 5,448,375.

[21] Appl. No.: 441,102

[22] Filed: May 15, 1995

Related U.S. Application Data

[63] Continuation of Ser. No. 855,987, Mar. 20, 1992, Pat. No. 5,448,375.

[51] Int. Cl.⁶ ............................. H04N 1/00; G06K 9/18
[52] U.S. Cl. .................... 358/403; 358/404; 358/444; 358/468; 382/182; 395/104; 395/428
[58] Field of Search ........................ 358/403, 450, 358/452, 453, 400, 404, 444, 468; 382/182, 195; 395/104, 108-149, 428

[56] References Cited

U.S. PATENT DOCUMENTS

| | | | |
|---|---|---|---|
| 4,587,633 | 5/1986 | Wang et al. | 364/900 |
| 4,833,720 | 5/1989 | Garcia-Serra | 382/11 |
| 4,893,333 | 1/1990 | Baran et al. | 379/100 |
| 4,972,496 | 11/1990 | Sklarew | 382/187 |
| 5,060,980 | 10/1991 | Johnson et al. | 283/70 |
| 5,099,340 | 3/1992 | Kamada et al. | 358/403 |
| 5,126,858 | 6/1992 | Kurogane et al. | 358/450 |
| 5,172,245 | 12/1992 | Kita et al. | 358/403 |
| 5,231,510 | 7/1993 | Worthington | 358/400 |
| 5,251,265 | 10/1993 | Döhle et al. | 382/119 |
| 5,267,047 | 11/1993 | Argenta et al. | 358/400 |
| 5,444,840 | 8/1995 | Froessl | 395/145 |
| 5,448,375 | 9/1995 | Cooper et al. | 358/403 |
| 5,465,167 | 11/1995 | Cooper et al. | 358/468 |

FOREIGN PATENT DOCUMENTS 0283267  9/1988  European Pat. Off. .

OTHER PUBLICATIONS

Abstract of JP62 066 765, Patent Abstracts of Japan, Aug. 20, 1987.
U.S. Patent Application No. 08/240,798 entitled "Self-Clocking Glyph Shape Codes", filed on May 10, 1994.
U.S. Patent Application No. 08/185,320 entitled "System For Reading A Form Utilizing Encoded Indications For Form Field Processing" filed on Mar. 19, 1993.
U.S. Patent Application No. 08/543,232 entitled "Data Access Based On Human-Produced Images" filed on oct. 13, 1995.
U.S. Patent Application No. 08/560,172 entitled "Analyzing An Image Of A Document Using Alternative Positionings Of A Class Of Segments" filed on Nov. 17, 1995.
U.S. Patent Application No. 08/374,408 entitled "Source Verification Using Images" filed on Jan. 17, 1995.

*Primary Examiner*—Edward L. Coles, Sr.
*Assistant Examiner*—Madeleine A. V. Nguyen

[57] ABSTRACT

Storage, manipulation, and retrieval of files, for example data representations of scanned documents, is facilitated by establishing a relationship between an arbitrary, image domain file label and a computer recognizable text domain file name for the file. Selection of the arbitrary, image domain file label is interpreted as a selection of the related file. The arbitrary, image domain file name is assigned by way of a paper form or the like, and may be assigned at the time of document storage. The arbitrary, image domain file label facilitates the meaningful naming of a file for storage when a keyboard or other typical text entry apparatus is unavailable, such as when inputting a document for storage by way of a facsimile machine. Character recognition is not performed on the arbitrary, image domain file label, so the burden on the processing resource is minimized, while errors from inaccuracy are eliminated. Selection of a file for processing by way of its arbitrary, image domain file label may be by appropriate indication on either a screen display or a printed form.

25 Claims, 10 Drawing Sheets

METHOD AND SYSTEM FOR LABELING A DOCUMENT FOR STORAGE, MANIPULATION, AND RETRIEVAL

This is a continuation of application Ser. No. 07/855,987, filed Mar. 20, 1992, now U.S. Pat. No. 5,448,375.

BACKGROUND OF THE INVENTION

The present invention relates generally to document processing methods and systems, and more specifically to a method and system for labeling a document with an arbitrary, image domain document label for document storage, manipulation, and retrieval.

Scanning documents for processing on a digital computer, such as a personal computer ("p.c."), a workstation, or other digital data processing resource is now routine. Furthermore, remote document storage, manipulation, and retrieval is becoming more commonplace today given the improving interfaces between computers and telecommunication devices such as fax machines. For example, a user can now "fax" a document to his computer for the purposes of storing the document on the computer, redistributing the document via the computer, etc. What ties these two different document processes together is that they both involve apparatus peripheral to the data processing resource. The present invention is concerned with facilitating the use of such peripheral apparatus, specifically the naming and referring to files stored on the data processing resource.

For purposes of the present discussion, the digital data processing resource such as the p.c., workstation, and the like will be referred to herein as a computer. Document as used herein shall be understood to mean a carrier, such as paper, for carrying markings, as well as the markings, if any, applied to the carrier. A file as used herein shall be understood to mean a collection of data, for example that representing a scanned image of a document, stored or accessible to a computer. The term electronic representation of data will be used herein, although the representation of the data (i.e., data representation) may be electronic, magnetic, optical, or other appropriate representation. Furthermore, the data may be in analog or digital format. Finally, document storage, manipulation, and retrieval will be understood to represent all actions that a user may perform on a document and its electronic representation, including those requiring communication between a peripheral apparatus and the computer. For example, this includes document scanning and transmission to the computer from a "remote" scanner, retrieving a file from the computer, transferring a document from one computer to another computer, etc. These definitions will simplify the explanation herein of the background and details of the present invention, although it will be understood that their use should not be interpreted as limiting the spirit and scope of the present invention.

Fundamentally, in order to perform any task on a document requiring communication between a peripheral apparatus and the computer, the document must be represented by data, i.e., an electronic representation of the document must be generated. Typically, the generation of an electronic representation of a document will be performed by a document scanner, which generates a description of the on/off state of the picture elements ("pixels") comprising the image, and packages the representation as a file. The form of the electronic representation may, for example, be a bitmap of the document or a coded collection of data representing the document.

Once an electronic representation of the document (hereafter referred to as an "electronic document") is generated, there must be a way of uniquely identifying it. This requirement is most commonly handled by the disk operating system resident on the computer. For convenience, virtually every disk operating systems permits, and in fact requires either the user or the computer to assign a file name to the file containing the electronic document for subsequent identification of the file. According to known document storage, manipulation and retrieval systems, the user-selected file name must be in a format which is recognizable by the computer, for example encoded text such as EBCDIC or ASCII which may be entered from a keyboard.

Electronic documents transmitted to a computer for storage and/or processing from a peripheral device are typically named at the time of transmission to or receipt by the computer in association with the task of document storage. For example, a user may enter via a keyboard attached to the sending or receiving device an encoded text name for the electronic document. Alternatively, the sending or receiving device may automatically assign an encoded text name to the electronic document according to a preestablished rule for name assignment. Typically, the task of document storage involves establishing a destination for the file in a memory media, such as a physical location on a magnetic disk, in RAM, etc., and a system identification ("system ID") of that destination. As part of the storage process, the disk operating system establishes and maintains a correspondence between the assigned file name and the system ID.

The file name, when assigned by the user, is often a mnemonic device or other label allowing a user to identify from the file name the general or specific contents of the file. When the file name is assigned by the system, it is most often a generic name such as, for example, the user's name, the name of the device from which the file was transmitted, the date and time of creation of the file, etc. Thus, a user is typically more likely to be able to identify the contents of a file when the user assigns the file name than when it is assigned by the system.

There are known systems that permit document retrieval using peripheral apparatus, such as a fax machine. One disclosure of such a system is U.S. Pat. No. 4,893,333. According to this reference, a prestored document is identified for retrieval by way of indicia imparted on the form, for example, so-called bar codes, fill-in check boxes or fill-in fields. The idea of identifying a form absent such indicia by use of appropriate image processing software is also disclosed therein. Furthermore, performing certain operations (store, retrieve, forward, etc.) on documents by way of a peripheral device, is provided when the document is capable of being identified by Way of dual-tone DTMF telephone signals, as disclosed for example, in U.S. Pat. No. 4,918,722, or in the User Handbook, Verison 3.01, for the Xerox® FaxMaster 21™ software product.

One problem continually encountered in the art is that not all peripheral devices are accompanied by a keyboard allowing the user to enter an appropriate file name, for example for assigning a file name for file storage, accessing prestored files, etc. A typical stand-alone scanner comprises optical imaging components, software for processing images, and possibly paper document handling mechanisms. Typical facsimile devices include the above as well as a numerical keypad, but rarely include all of the keys of a full alphanumeric keyboard. In general, present peripheral apparatus limit the ability of the user to assign a meaningful file name to files and access previously stored files.

Furthermore, when identifying pre-stored and pre-named files by way of filling in check boxes or fill-in fields, at least one check box or fill-in field must be appropriately marked for each character in the file name. This leads to time consuming and error prone document identification. For example, if check boxes are employed to identify a file, a great many such check boxes must be provided to allow identification of alphanumeric file names. If fill-in fields are employed, the processing apparatus which identifies the document must ultimately perform character recognition on the indications in the fill-in fields.

Finally, virtually every system for establishing file names requires not only that the file name be in a format which is recognizable by the computer, but that the character set used in the file name be the native character set of the computer. For example, it is generally not possible assign a file name to a fire using a foreign language character set or graphics unless the processing apparatus is capable of recognizing the character set or graphics. This precludes such operations as assigning a file a file name with Kanji characters when the computer is capable of recognizing only the Latin characters set.

SUMMARY OF THE INVENTION

The present invention overcomes the problem of the limits imposed on a user in entering a file name by providing a method and system for assigning a meaningful user-selected file label to files which uses existing peripheral devices. Specifically, for a file having an assigned file name, a relationship is established between an image domain file label and the file name assigned by the computer, so that the label may be employed to assist the user in identifying the file.

The present invention builds on the methods and systems of the prior art by providing a relationship between the assigned file name and the image domain file label for a file. This allows establishing a meaningful file label for a file which can stand in the place of the less meaningful assigned file name. Furthermore, by establishing this relationship, a user may more easily and directly identify a desired file in a system lacking a text entry device than heretofore provided by the prior art.

One aspect of the present invention involves storing a file on or by way of a computer. According to this aspect, the file is initially a document consisting of a carrier means such as paper, plastic, etc., having markings such as printing or writing thereon. A special cover form is employed which includes a region in which the user imparts an image domain label (for example a handwritten name or illustration) for the file. The document, prefaced by the cover form, is scanned by a scanning means whose output is an electronic data file containing the image of the form and the document. This data file is transmitted to a computer, where it is assigned a file name and stored as a file either in the computer's memory or in a memory media associated with the computer.

Associated with the transmission of the data file to the computer will be an instruction to the computer to store the file (the instruction being read from the form or other input device). The computer establishes a location in which to store the file and creates a file name for the file. The computer maintains the association between the location of the file and the file name according to methods well known in the art. Next, the computer distinguishes the data representing the form and the data representing the document, locates representation of the image domain label imparted on the form, and establishes a relationship by way of data base entries between the data representing the image domain label and the data representing the document. When the computer is called on to access the document, it displays or prints the image domain label in such a manner that selection of the image domain label is interpreted by the computer to mean selection of the document.

Another aspect of the present invention involves accessing for sending, retrieving, deleting, etc., a previously stored electronic document having related to it an image domain file label. According to this aspect, a user would request a listing of the labels of an appropriate set of files which are stored on or accessible to the computer. In response to the request for the listing, the computer generates a display of the image domain in file label, if any, and possibly other indications, for each file. The display may be an image formed on a computer display, a printed paper document, etc. From this display, the user selects the item(s) of interest by selecting the image domain file label, for example by highlighting the file label on the computer display or imparting a check mark in a check box field on a paper or other printed document of the display. Based on the preestablished relationship between the image domain file label and the file name, the computer is able to interpret the user's selection as a selection of the associated file.

Closely related to the above is the aspect that an image domain label may be assigned to a file and used to identify that file without resort to character recognition software such as optical character recognition ("OCR"). That is, there is no requirement to convert the image domain file label into a machine recognizable format. This reduces the demands on the processing resources of the computer, increases the speed at which the computer can process instructions involving the image domain label, allows use of characters other than those supported by the character set of the computer (e.g., Kanji characters used on a standard DOS machine), allows use of non-textual labels (such as figures or relevant non-textual marks), and allows the user to select the image domain label without requiring the user to duplicate that label.

Yet another aspect of the present invention is that the file to which the image domain label is assigned need not be an electronic document. For example, the file may be data representing one or more instructions, or a program of instructions, which the computer will follow to accomplish specific tasks. That is, the underlying subject matter having the associated image domain label may be a computer program which may be referred to, loaded, and/or run in or by the computer by referring to the image domain label. Alternatively, the file to which the image domain label is related may be one or more of many other types of files, such as binary files in formats utilized by other data processing resources. In fact, the term "file" is used herein in its broadest sense to refer to the element to which the image domain label is assigned, and shall be understood to mean any data item or portion of a data item which is appropriate for assignment of an image domain label.

Further aspects of the present invention and the manner in which it addresses the above problems, as well as others, will become more readily apparent from the following detailed description when taken in conjunction with the accompanying drawings, detailed description, and claims.

BRIEF DESCRIPTION OF THE DRAWINGS

In the following drawings, like reference numerals will be used to refer to like elements as between the various figures, in which.

DETAILED DESCRIPTION

Figure 1:
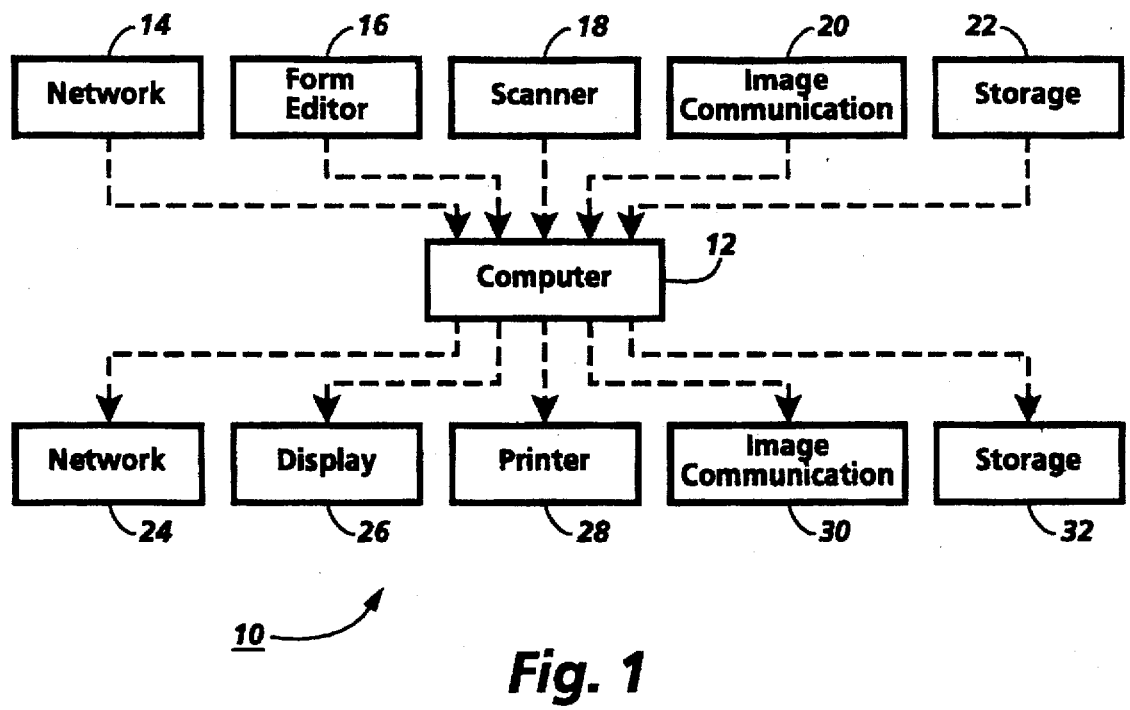
FIG. 1 shows an apparatus, including a computer and peripheral devices of the type which might typically employ or be a part of the present invention.

Referring to FIG. 1, there is shown an apparatus 10 of the type which might typically employ or be a part of the present invention. Apparatus 10 includes a computer 12 (such as a p.c., workstation, server, or other digital data processing resource) to which one or more peripheral devices may be communicationally interconnected. These peripheral devices include devices designed primarily for communicating to computer 12, such as a network connection 14, a form editor 16, a scanner 18, an image communication means 20 (such as a facsimile or "fax" machine), and a storage device 22 (such as a magnetic, optical or electrical storage device), and devices designed primarily for receiving communication from computer 12, such as a network connection 24, a display device 26 (such as a CRT), a printer 28, an image communications means 30 (such as a fax machine), and a storage device 32 (such as a magnetic, optical or electrical storage device).

Figure 2:
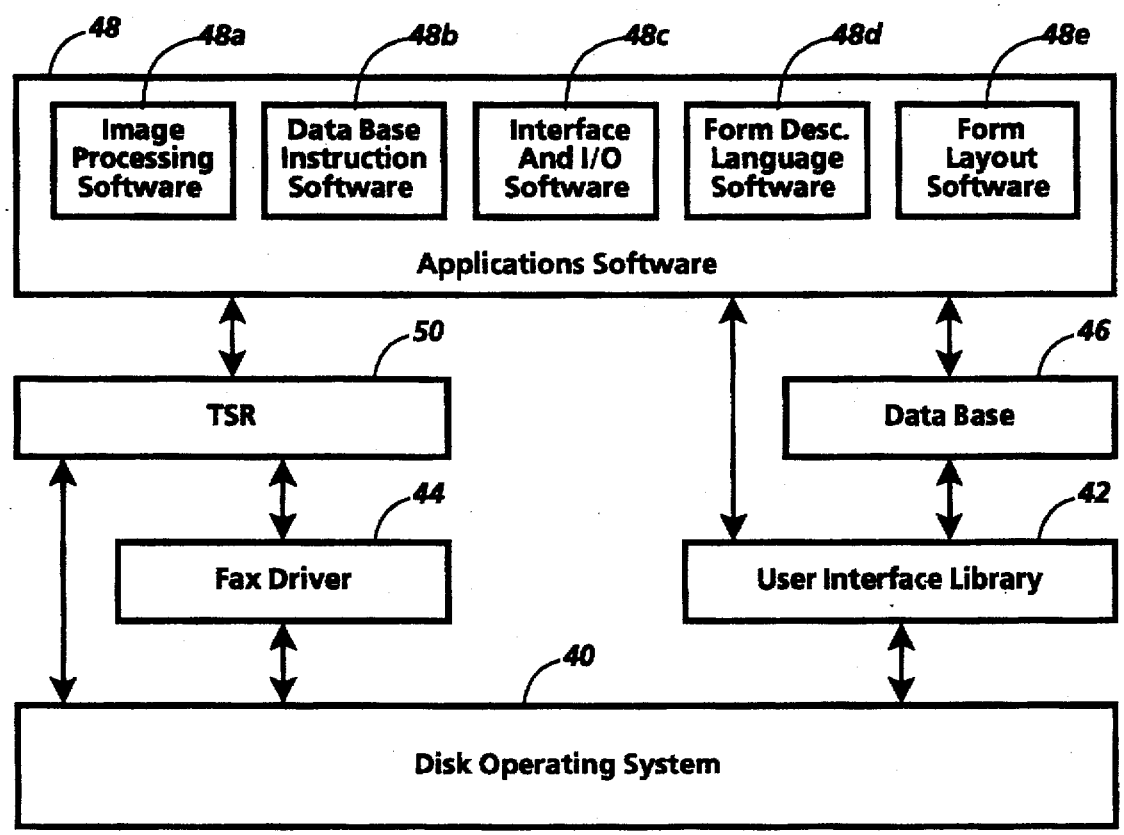
FIG. 2 is an illustration of various software modules, including a common communicational interconnection between same, of the type which might typically employ or be a part of the present invention.

Computer 12 will generally include a central processing unit (not shown) which performs processing of data under control of various software modules. With reference to FIG. 2, according to the present invention these modules include, inter alia, disk operating software module 40 (such as MS-DOS™ from Microsoft® Corporation), a user interface software module 42 (such as Microsoft® Windows™), a fax interface software module 44, a data base software module 46 (for example db_VISTA™ produced by Raima Corp.), applications software module 48, and optionally, a terminate and stay resident ("TSR") software module 50 whose instructions may be loaded from either or both of the fax interface software module 44 and the applications software module 48. One or more of the various modules may form a software product. The various modules would typically be in communication with one another roughly as illustrated. In particular, according to one embodiment of the present invention, applications software module will include image processing software module 48a, data base instruction software module 48b, interface and I/O software module 48c, form description language software module 48d, form layout software 48e, and other modules for accessing and processing data as will be understood by one skilled in the art.

Figure 3:
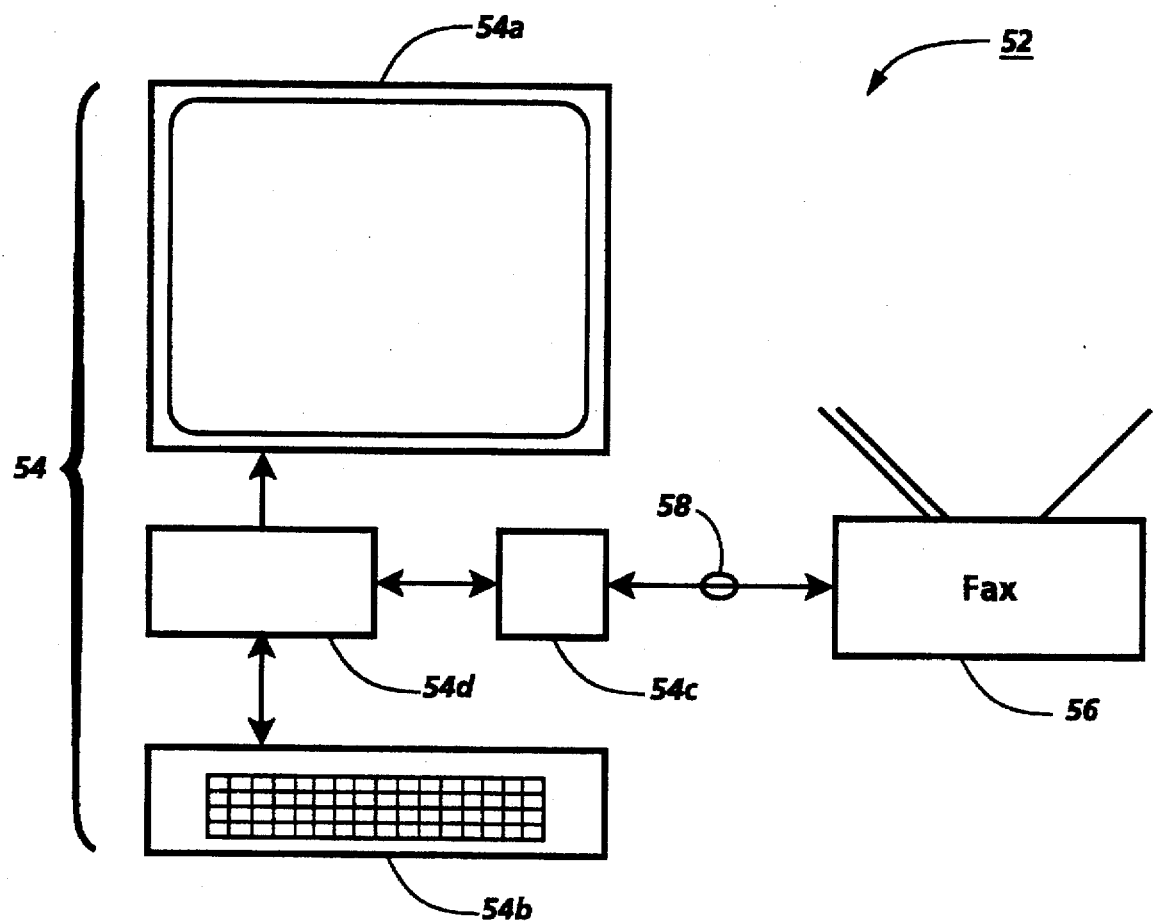
FIG. 3 shows an apparatus including a computer and a facsimile machine capable of both sending data to and receiving data from the computer of the type which might typically employ or be a part of the present invention.

In order to clearly illustrate one embodiment of the present invention, an apparatus 52 is illustrated in FIG. 3 which includes a computer 54, and a single peripheral device, which in this embodiment is a fax machine 56 capable of both sending data to computer 54 and receiving data from computer 54 via common telephone lines 58. Furthermore, computer 54 will be assumed to include, inter alia, a display device 54a, an input device 54b, a fax card interface module 54c (including fax interface software module 44 (FIG. 2), and any additional hardware and software for enabling the computer to receive and send fax data via telephone lines 58, and processing and memory unit 54d. The present invention has been implemented as a software product on an IBM compatible Personal Computer ("PC") running MS-DOS™ from Microsoft® Corporation, with Microsoft® Windows™ as the user interface software module 42. The software product has been stored on a magnetic hard disk drive of the PC, although its storage for access on any of a wide variety of data storage media would function equally well where appropriate. The fax card 54c and associated software have been implemented, for example in packages from Intel® Corporation such as SatisFAXtion™, The Complete Communicator™ or The Complete Fax™ from The Complete PC, Inc., proFAX™ from Charter Electronics Industries Pte. Ltd, etc. In general, it will be understood that other arrangements, with additional or different apparatus, may serve equally as a system within which the present invention may reside or operate.

The purpose of apparatus 52 is, at least in part, to allow a user to convert a paper document to an electronic document via fax machine 56, send the electronic document over telephone lines 58 to computer 54 via standard facsimile communication protocols, such as CCITT group 3, to command computer 54 to perform certain operations (hereafter referred to as "tasks") by way of marks made on paper which are converted and sent to computer 54 per the above, and to print documents at fax machine 56. In this way, fax machine 56 serves to perform the tasks of 3 separate devices—(a) an input scanner, (b) a computer operator's interface, and (c) a printer.

The present invention in operation will now be illustrated with reference to apparatus 52 of FIG. 3. Assume that a user is at a physically distant location from computer 54, but that fax machine 56 is located at the user's distant location. Suppose further that a user has a paper document which the user desires to store in electronic format on computer 54. This task will be referred to as remote document storage (or more succinctly as the "store" task). The paper document may be of virtually any type, for example one having text and/or illustrations imparted thereon. The steps in accomplishing this task will be discussed with reference to FIGS. 4 and 5.

Figure 4:
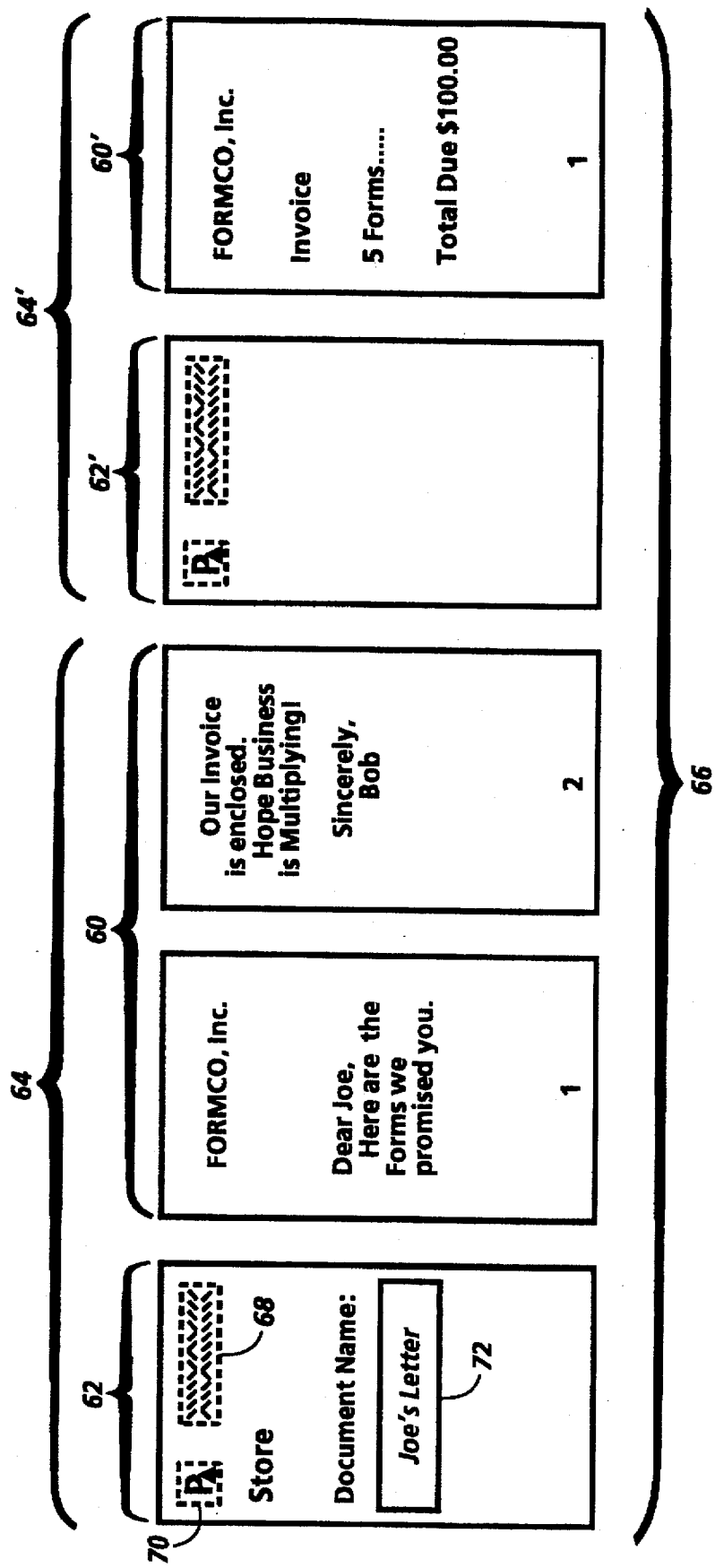
FIG. 4 is an illustration of a batch, showing jobs, documents, and forms.

With reference to FIG. 4, the user will assemble together one or more pages which comprise a document 60, and preface document 60 by an instruction form 62. Instruction form 62 will generally be a single page form, although multiple page instruction forms may be appropriate in certain circumstances. Together, document 60 and the instruction form 62 are referred to as job 64. It will be appreciated that a user may input to computer 54 (FIG. 3) one job at a time, or may submit plural jobs 64, 64', etc., together. As a collection, the job or jobs assembled for transmitting to computer 54 is referred to as a batch 66.

Once assembled (in the order shown from left to right in FIG. 4), batch 66 is loaded into fax machine 56 (FIG. 3) where its image is captured and an electronic form of the image of the batch generated (hereafter referred to as "batch image data"). Fax machine 56 will generate the batch image data for transmission to computer 54 in a standard format, such as the CCITT group 3 encoding format.

Figure 5:
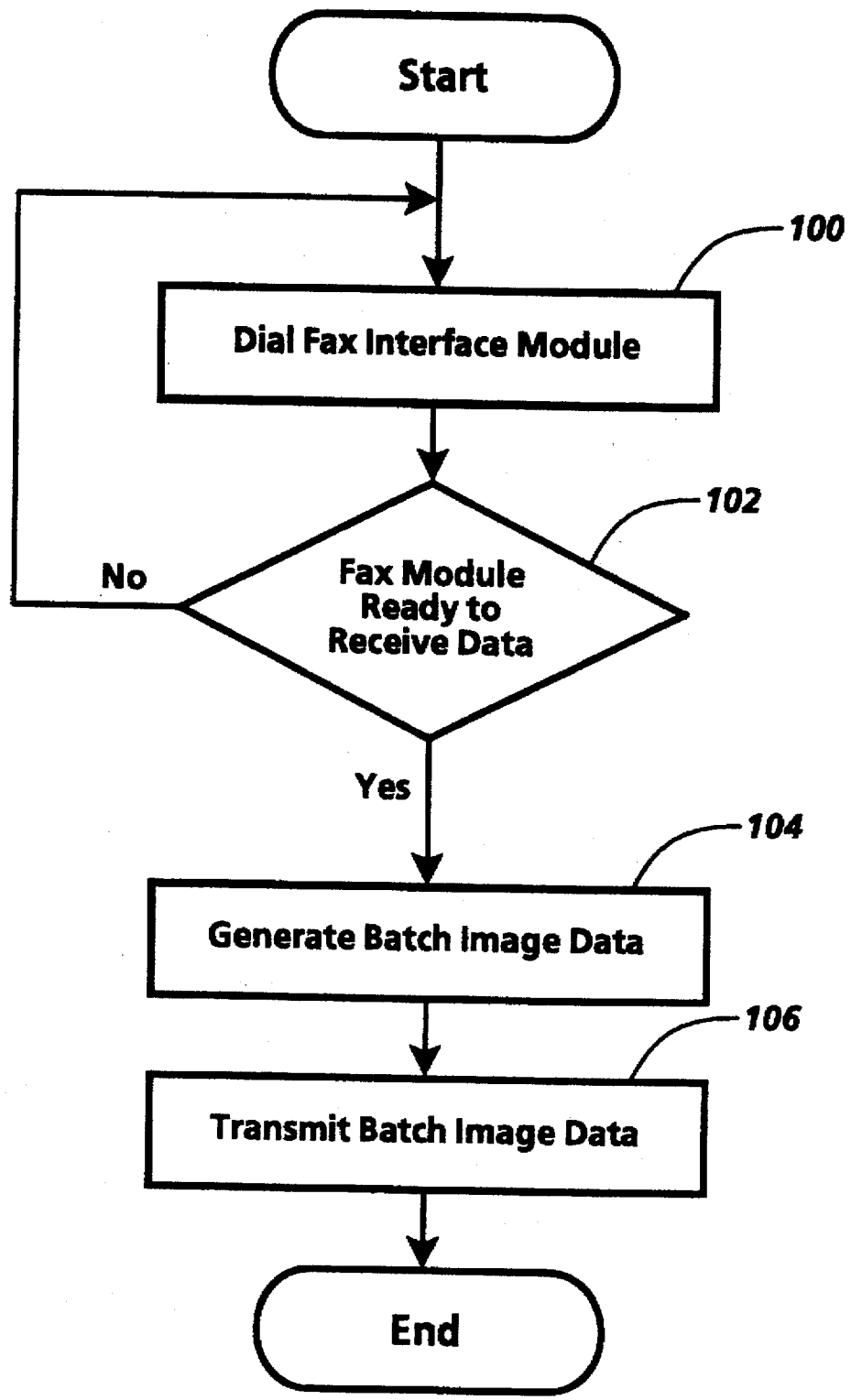
FIG. 5 is a flow diagram illustrating the steps to accomplish remote document storage according to one embodiment of the present invention.

FIGS. 5 through 8 are flowcharts illustrating the steps for performing remote document storage on computer 54. FIG. 5 shows the initial steps performed by fax machine 56 to accomplish remote document storage according to the present invention. To begin, fax machine 56 dials the number of the fax interface module 54c, which is provided to it by the user, as shown at step 100. Fax module 54c is then polled at step 102 to determine if it is ready to receive the batch image data. If the fax interface module 54c is not ready to receive the batch image data, the fax machine may disconnect the line and retry dialing the fax interface module at a later time. However, if the fax interface module 54c is ready to receive the batch image data, the batch image data is generated by the scanning and processing hardware and software of fax machine 56, as shown at step 104. The batch image data is then transmitted via telephone line 58 to the fax interface module 54c at step 106. The batch image data is received by the fax interface module 54c, which has resident memory or utilizes a portion of the memory of processing and memory unit 54d for temporarily storing the batch image data. Fax interface module 54c will automatically assign an appropriate file name and/or system ID to the batch image data file. Computer 54 then processes the batch image data as follows.

Figure 6:
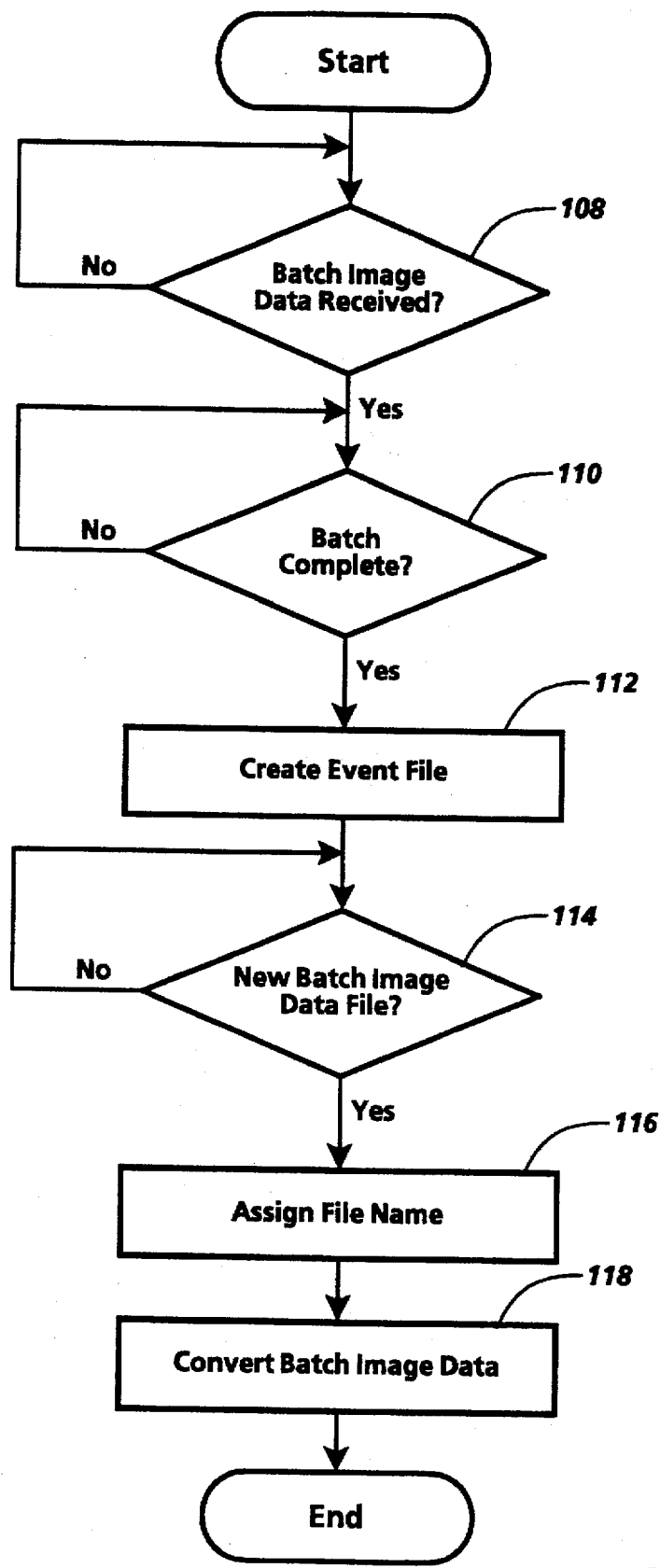
FIG. 6 is a flow diagram illustrating the steps involved in transferring a batch to the computer for processing according to one embodiment of the present invention.

With reference to FIG. 6, which is a flow chart illustrating the steps in transferring a batch to the computer for processing, periodically, the fax interface module 54c is polled to determine if it has received batch image data, as shown at step 108. Since processing according to the present invention begins at the batch level, step 110 is to determine whether a complete batch has been received. One method for doing so is to determine whether the telephone connection between fax interface module 54c and fax machine 56 has been broken. If so, it may be assumed that the received batch image data is a complete batch. If it is determined that a complete batch has been received, the batch must next be transferred to the computer.

For the purpose of the following description it will be assumed that TSR software module 50 acts as an interface between fax card interface software module 44 and applications software module 48. This is a convenience which facilitates processing, and represents only one of many ways to establish such an interface.

Furthermore, in the present embodiment, a data base called a job data base may be used as a scheduler to control the performing of certain tasks by the computer. The job data base is comprised of defined entries called actions, each action having a link to other actions and/or to entries in a second data base referred to as an information data base, which functions primarily as a repository for data used by, inter alia, the job data base. An action entry will include data indicating the action's function, and data that can be used in scheduling performance or execution of the action's function. Each task will have at least one action associated with it. A list of possible actions with their definitions is given in Appendix 1, attached hereto. It will be appreciated that the scheduling of actions and organization of stored items may be handled by traditional methods involving a CPU, main memory, etc. as well known in the art.

The next step is to transfer the batch to computer 54 for processing. According to the present invention, a file is created at step 112 (hereinafter referred to as an "event file") for maintaining relevant information about the batch. The event file is assigned a name automatically by the computer, for example of the type FAXAAAA.EVT, where AAAA represents a four digit integer. This may be handled, for example, by TSR software module 50, by maintaining and/or referring to a portion of the computer's memory reserved for keeping track of the value of the last integer assigned to a file name. In this way, each event file gets a sequentially numbered file name.

TSR software module 50 will then cause certain information to be written into the event file including, for example, that there is a new batch image data file stored, and the file name assigned by the fax interface module 54c to that batch image data file. This facilitates processing of the batch by the applications software module 48 as follows.

Applications software module 48 will periodically poll the TSR software module 50 to determine if there is a new batch image data file for processing, as shown at step 114 of FIG. 6. One convenient way of accomplishing this is to ask TSR for the current event file number. If TSR has no new event file, the current event file number would be set to 0. Thus, the applications software would interpret a 0 in response to its poll as an indication of no new event file. However, if TSR has a new event file to pass to the applications software module 48, TSR would respond to a poll with an integer representing the integer assigned to the event file as described above. Thus, applications software module 48 would interpret receipt of a non-zero integer, for example BBBB, in response to its polling by forming the file name FAXBBBB.EVT. This is represented by the receipt of file name for the event file at step 116. It would then look for the information stored in file FAXBBBB.EVT for further processing. This is handled by an action called an input action. In this way, access to the batch image data file is quickly and simply facilitated.

At this point, the batch image data file is a DOS file in a standard encoded fax format, and may be stored in a file format particular to fax interface module 54c. In order to facilitate a uniform processing of the batch image data, the applications software module calls a conversion function which, using the information in the event file, converts the batch image data into an appropriate intermediate data format such as that described in U.S. application Ser. No. 07/856,000, now issued as U.S. Pat. No. 5,299,018, which is incorporated herein by reference. This step is shown at 118 of FIG. 6.

Figure 7:
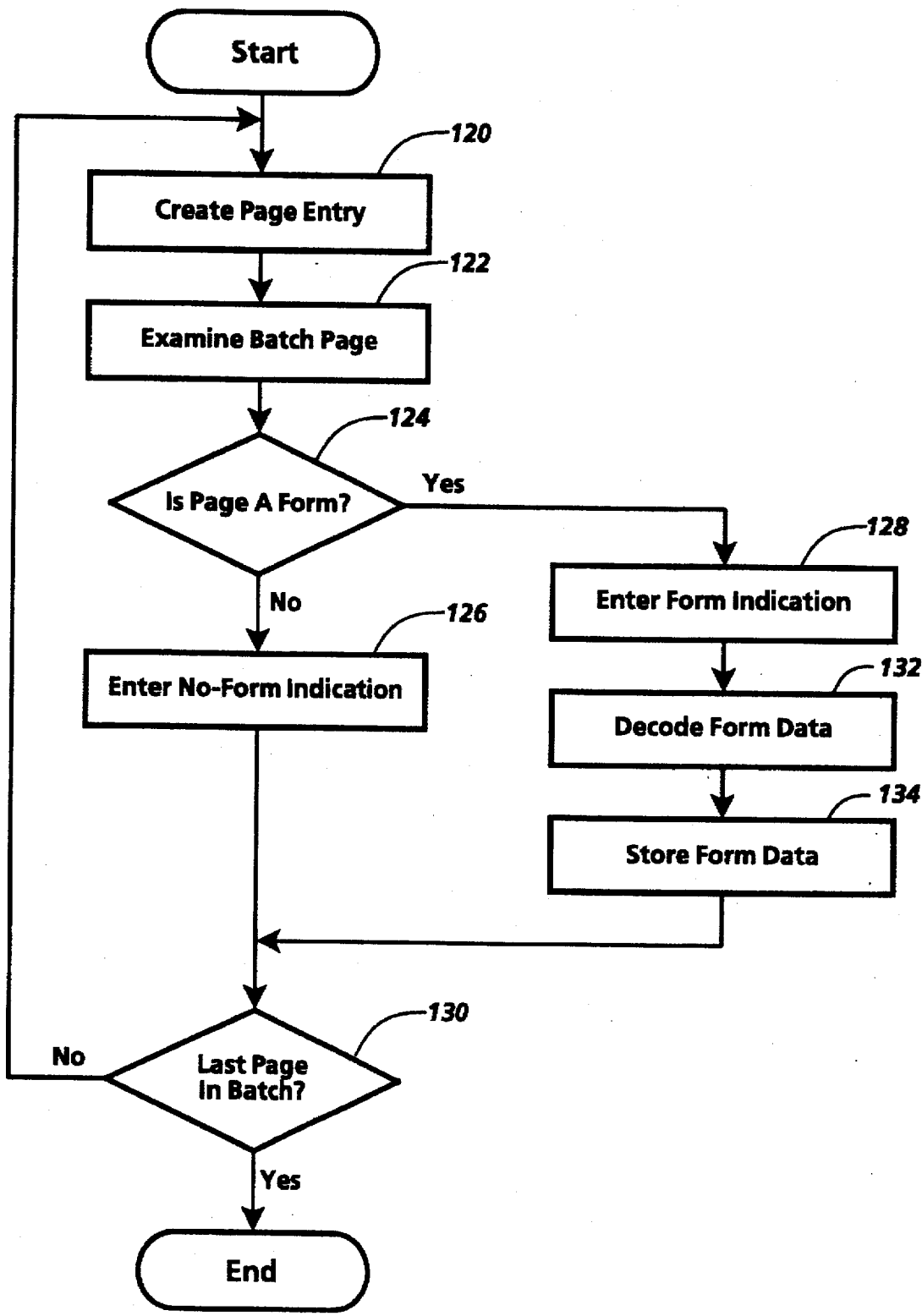
FIG. 7 is a flow diagram illustrating the steps involved in processing a batch according to one embodiment of the present invention.
Figure 8:
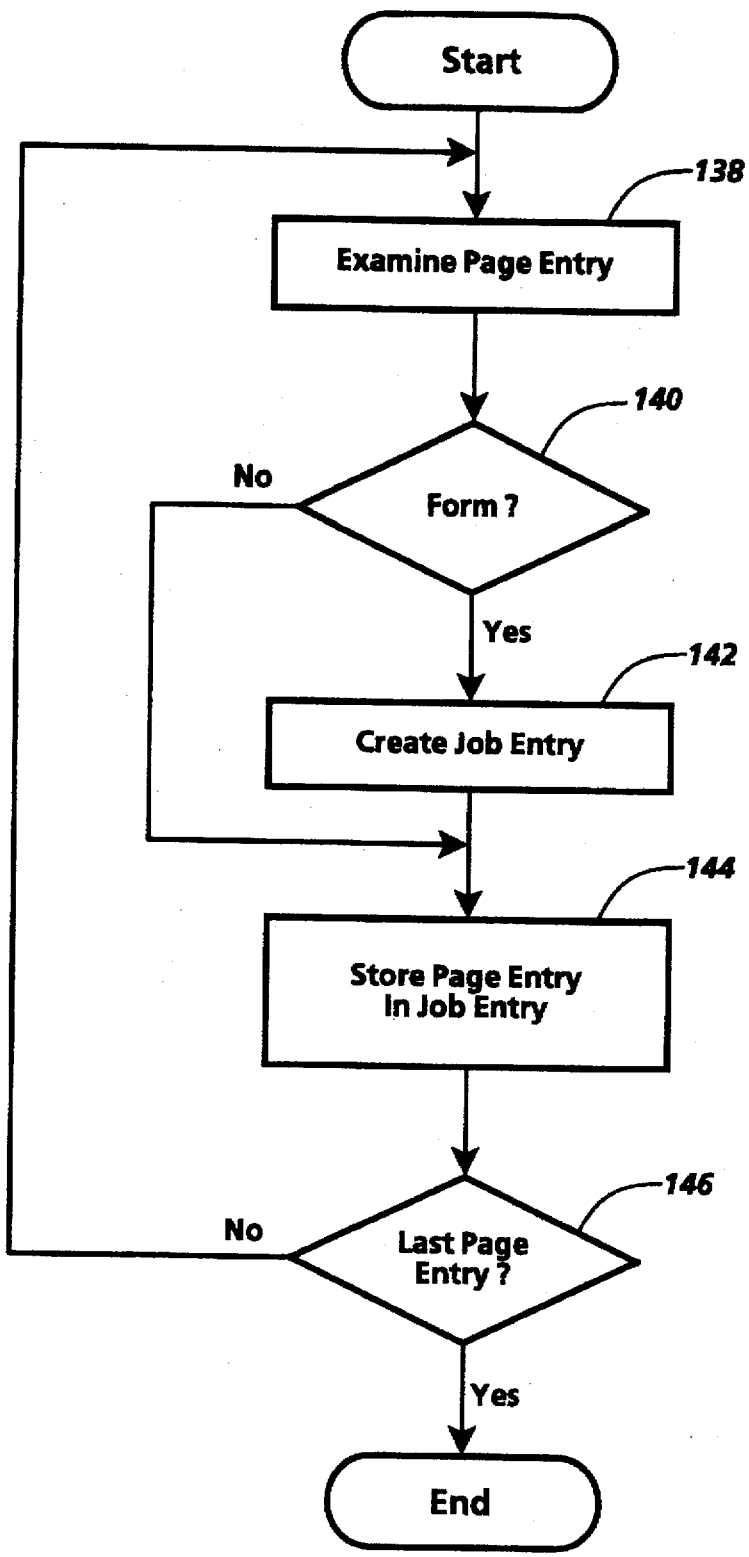
FIG. 8 is a flow diagram illustrating the steps involved in a job set action according to one embodiment of the present invention.

Processing of the batch will now be described with regard to FIG. 7. In the aforementioned intermediate data format, the batch is treated as a collection of discrete pages; the standard fax format which fax machine 56 (FIG. 3) created the batch image data in will contain indications, such as start or end of page indications, allowing page differentiation.

This facilitates the first step in processing the job, execution of the batch action, which creates a data base entry in the job data base for each page of the batch image data at step 120. This may be accomplished by examining the batch image data for the aforementioned page indicators, or by transferring from the fax interface module 54c a count of the number of pages in the batch, for example by way of the event file. This enables appropriate image processing software module 48a to examine each page of the batch individually, and to record for each page appropriate data in a separate page entry. For example, such data may include whether a page is an instruction form 62 or not, which batch the page is a part of, etc.

Execution of the batch action will cause a page action to be associated with each page entry in the information data base. These page actions cause image processing software module 48a to examine each page in the batch image data to determine whether the page is a form or not, and record the form/not form information in the page entry in the information data base. This is shown at steps 122 to 128.

Returning to FIG. 4 for the moment, each instruction form 62 includes a form data region 68 which can carry coded data of various types. According to one embodiment of the present invention, coded form data region 68 contains a code which allows computer 54 to identify the form and the steps required to process the form and associated document(s), if any. Alternatively, coded data region 68 may contain a complete description of the form and how to process the form and associated document(s) as described in U.S. Pat. No. 5,060,980, which is incorporated herein by reference. The format of the coding may be of the type described in copending U.S. patent application Ser. No. 07/560,514, continued as Ser. No. 07/931,554, which was in turn continued as 08/240,798 entitled "Self-Clocking Glyph Shape Codes", which is incorporated herein by reference, or may be another computer readable coding scheme as appropriate.

By examining form data region 68, the applications software module may determine whether the subject page is a form or not. The presence of coded data in form data region 68 indicates that the page is a form, while the absence of coded data indicates the page is not a form.

An alternative method and device for determining whether a subject page is a form or not is to include on form pages a logo or monogram in region 70, and to employ appropriate image processing software to determine whether a page contains the logo or monogram in that region. Again, presence of the logo or monogram in region 70 indicates that the page is a form, while absence of the logo or monogram indicates that the page is not a form.

If a page is determined to be a form, image processing software module 48a next examines the form data region 68, and identifies the form. Typically, the information encoded in region 68 will be a form identifier, pointing to a form description, and steps for processing the form and any associated document(s), stored in the information data base or in the computer's memory. The form identity is then also stored in the page entry for the form page in the job data base. Returning to FIG. 7, this processing is shown at steps 132 and 134.

When each of the page actions are completed, and no more pages remain in the batch to be examined, a job set action is executed, which is also established by the batch action. The job set action will be described with regard to FIG. 8. The function of the job set action is to break the batch up into discrete jobs comprising a form and associated document(s), if any. The page entries for the batch are examined at step 138. The determination of whether a page is a form or not is made at step 140. If a page entry is indicated to be a form, a new entry is created in the job data base, called a job entry, at step 142. The page entry containing a form indication is then entered into this job entry at step 144. If the page entry does not contain an indication that the page is a form, the page entry is entered into the current job entry. A determination is then made at sleep 146 as to whether the page entry just processed was the last page entry for the batch. If not, the next page is examined at step 138 per the above. If so, the end of the batch is reached, the batch has been fully divided into jobs, and the job set action is complete.

Once each job is defined, processing of the individual jobs may proceed. Initially, since each job begins with a form, a form action is created for each job. The role of the form action is to assemble the form description and any other pertinent data required by the image processing software to set the computer up to process the electronic document. At this point, a brief description of a form, such as form 150 shown in FIG. 9, will assist in an understanding of the processing of the job. Form 150 will be divided into one or more distinct regions, for example header region 152, store region 154, retrieve region 156, list region 158, etc. Each region may carry markings such as writing, coded information, or illustration, and user-modifiable fields such as clip region 160 or check boxes 162. Other such fields are within the scope of the present invention as well. The creation of such a form is disclosed in detail in U.S. patent application Ser. No. 07/854,520, now issued as U.S. Pat. No. 5,267,303, which is incorporated herein by reference.

As part of the form action, the form identification is used to access the form description in the information data base. Specifically, a data structure is created which contains a description of the location of the various user modifiable fields located on the form (if any). The form description and the batch image data file name are then presented to image processing software, which examines the user-modifiable regions for user modifications. That is, if the form is defined to have a clip region at a particular location, the image processing software locates that clip region on the form and clips the contents of (i.e., extracts the image from) that region. Likewise, if a form has a check box defined to be located at a particular location, the image processing software determines whether the box has been checked or not.

Figures 9, 10:
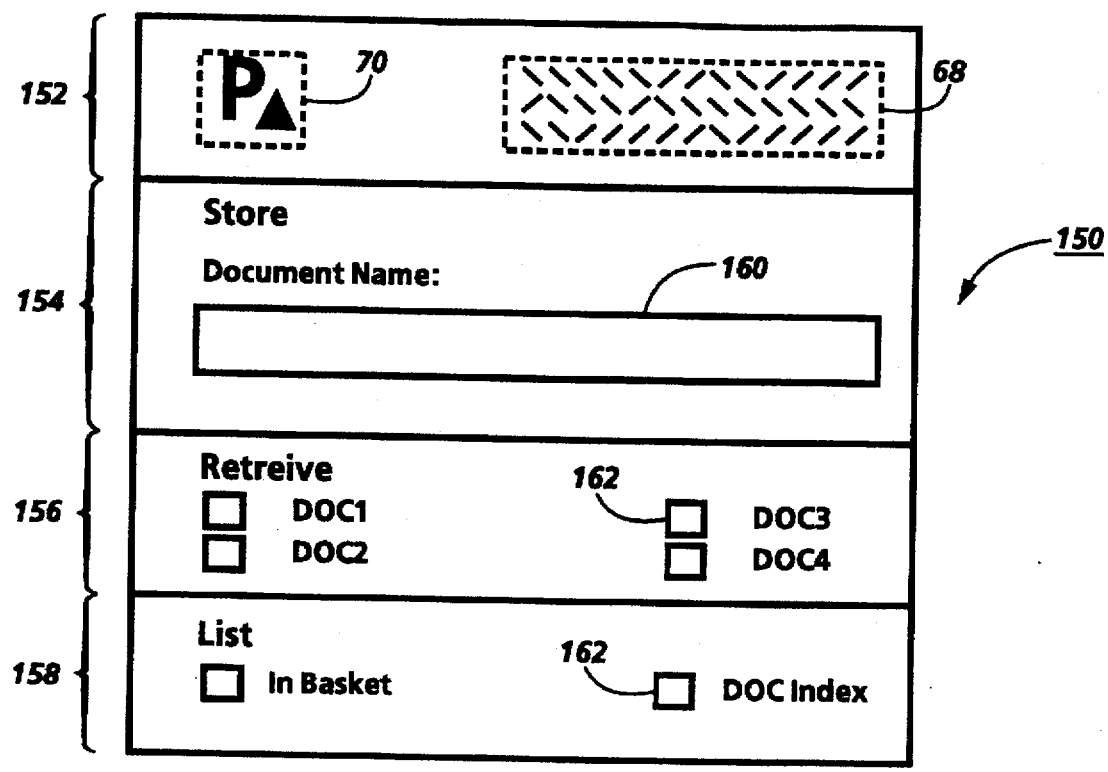
FIG. 9 is an illustration of a form according to one embodiment of the present invention.
FIG. 10 is an illustration of an action table generated by image processing software according to one embodiment of the present invention.
Figure 11:
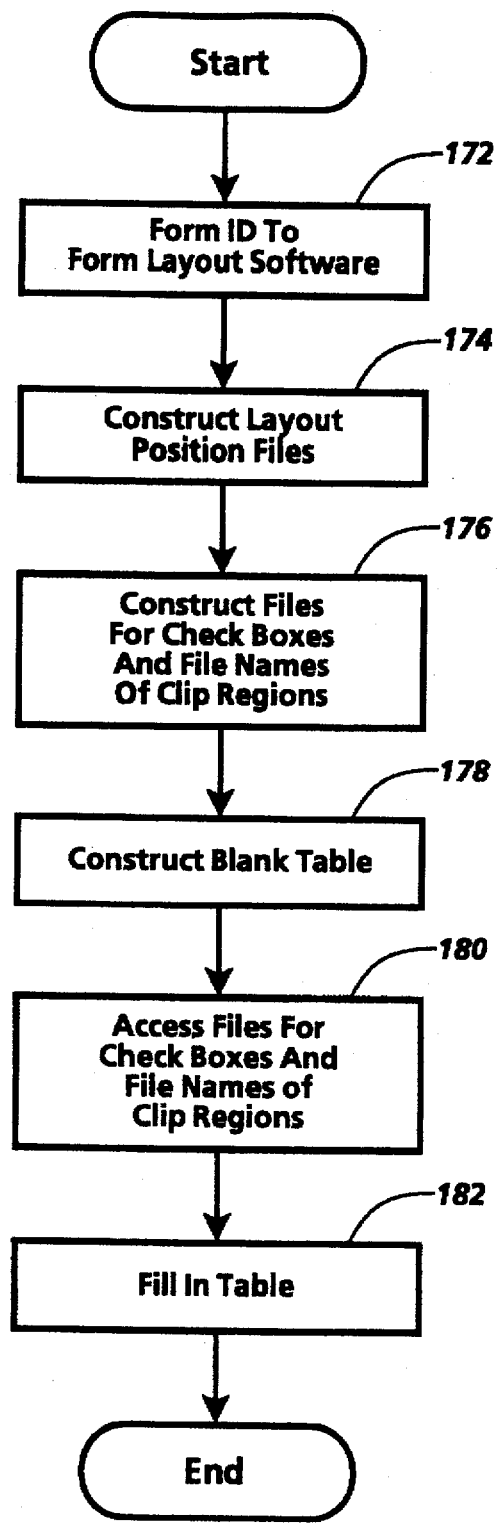
FIG. 11 is an illustration of the steps involved in providing a table for the establishment of processing actions in the job data base according to one embodiment of the present invention.

For convenience, the output of the image processing software analysis of the form is in the form of entries in a table established by the applications software module as follows. An example of a table 170 is shown in FIG. 10. Table 170 will have a number of entries, one or more of which correspond to a task which the form will cause the computer to perform. The steps for filling in table 170 are illustrated in FIG. 11. Initially, the form identification will be made available to form layout software module 48e as shown at step 172. From the knowledge of the form identification, form layout software module 48e is capable of constructing files whose contents indicate the positions of the various check boxes and clip regions, as shown at step 174. This indication might, for example, be in x-y coordinate values from a convenient reference point on the form.

The position files are then passed to the image processing software module 48a along with the page entry corresponding to the form page. The image processing software then locates the check boxes, if any, and determines for each check box whether the box is checked or not. This information is entered into a file. The image processing software also locates the clip regions, if any, and for each clip region clips the contents of the region and places the contents in a file. The file names for the files containing the contents of the clip regions are then put into a file. Together, these processes are shown at step 176.

From the form identification, the form description language software module may construct a blank table corresponding to that form at step 178. The files containing the information about which check boxes are checked and the file names of the files containing the contents of the clip regions are then accessed at step 180, and the data these files contain are used to fill in the blank table, resulting in a complete table 170 (FIG. 10) at step 182.

Returning to FIG. 10, table 170 will be divided into 4 columns. A first column 184 will be reserved for a pre-action step. The entries in this column will be used to determine which action entries will be made in the job data base to accomplish the task. For example, if the task is retrieve, the entry in column 184 will cause pre-retrieve and retrieve actions to be entered into the job data base. A second column 186 will be reserved for a modifier for the pre-action step. The entries in this column further determine what the action will be entered in the job data base. For example, if the task is to produce a list, the entry in column 186 will indicate whether the list is a retrieve list, send list, delete list, etc. A third column 188 will be reserved for a state indication. The entries in this column indicate whether a corresponding check box has been determined to be checked or not. Finally, a fourth column 190 will be reserved for a parameter indication. The entries in this column are, for example, the name of the file containing the clip region image forming the image domain file label.

Returning to FIG. 11, once access to table 170 has been provided to the applications software module, processing of the job proceeds by establishing appropriate actions in the job data base to execute the actions indicated in the pre-action step column 174, and to facilitate their execution by providing the items called for in the parameter column 180. In order to do so, the table is circulated through a sufficient number of times such that a sequential execution of the actions in the job data base will cause the desired result. For example, for the store task, an association between the file name of the document to be stored and the file name for the arbitrary, image domain document label must be established and maintained. The document itself is all pages of the job except for the form. Thus, the page entries in the job data base for the job are examined, and those entries which indicate that their associated page is not a form are entered into a document entry in the information data base. The file name of the arbitrary, image domain document label entered into the parameter column 190 of table 170 is linked with the pages of the document by way of an entry into the document entry. In this way, a relationship is established between the electronic document and the arbitrary, image domain document label.

It should be noted that this relationship may be subsequently altered by the user as convenient. For example, the user may have resorted to the image domain label because a keyboard was unavailable. However, the user may desire to convert the image domain label to a format which is recognizable by the computer, for example encoded text such as EBCDIC or ASCII which may be entered from a keyboard. This may be accomplished by establishing a function, in the manner of renaming a file, which permits the deletion of the image domain file name and the substitution of a text domain file name. Substituting an image domain file name for a text domain file name may be achieved by a similar operation in association with, for example, a scanner.

At this point, a user has stored the document on the remotely located computer, and a relationship has been established between the document and the document label. As will be shown, this will facilitate the user's performing many operations on the document, including retrieving the document, sending the document to another party, deleting the document, etc. For convenience, the following discussion focuses on sending the document. Since it will be understood that the description readily extends to many tasks that may be performed on, by or with the stored document, these other tasks are only discussed where their performance requires a substantial deviation from the description.

Initially, it will be assumed that the user is again at a location remote from the computer. In order to implement the send task, the user first requests from the computer a list of stored documents. According to one embodiment of the present invention, this request is made by way of a paper form, such as form 150 of FIG. 9. The form may be a dedicated list request form, or may be a multi purpose form, in which case the user may be required to select the list task and sections in which the list will be presented, such as send, retrieve, delete, etc. This form is sent to computer 54, where it is received by fax interface module 54c, while the input action is executed, etc., as detailed above.

The form requesting a list of documents will then be determined to be one invoking the list task, and processing will proceed to determine what actions must be invoked in order to accomplish the requested task. In response to the list task, a form will be generated having a list of possible recipients and a list of the documents which may be sent, and check boxes associated with each such that selection of a check box will ultimately be interpreted by computer 54 as a selection of the recipient or document associated with that check box, as detailed in the aforementioned application Ser. No. 07/854,520, now issued as U.S. Pat. No. 5,267,303. This form will then be transmitted to the user, for example by the computer dialing the user's fax machine and transmitting the form to the user's fax machine for printing.

The user will then indicate (i.e., select) on the send form the recipient(s) for the document(s) and the document(s) to be sent by placing an appropriate mark in the check boxes corresponding to each. This marked form is then sent to computer 54, where it is received by fax interface module 54c, while the input action is executed, etc., as detailed above. Upon processing the send form, a pre-send action is entered into the job data base which converts the indicated documents into the appropriate format for fax interface module 54c, and enters a send action for each recipient indicated on the form. Each send action then queues all indicated converted documents and instructs the TSR software module to coordinate the sending of each document, whether it be by way of fax transmission, network communication, or otherwise.

Retrieving a form will proceed in much the same fashion, with pre-retrieve and retrieve actions established and appropriate documents indicated. (It will be appreciated that by designating as a recipient the remote location that the user is at, it is possible to retrieve a document as an alternative to the retrieve task.)

Figure 12:
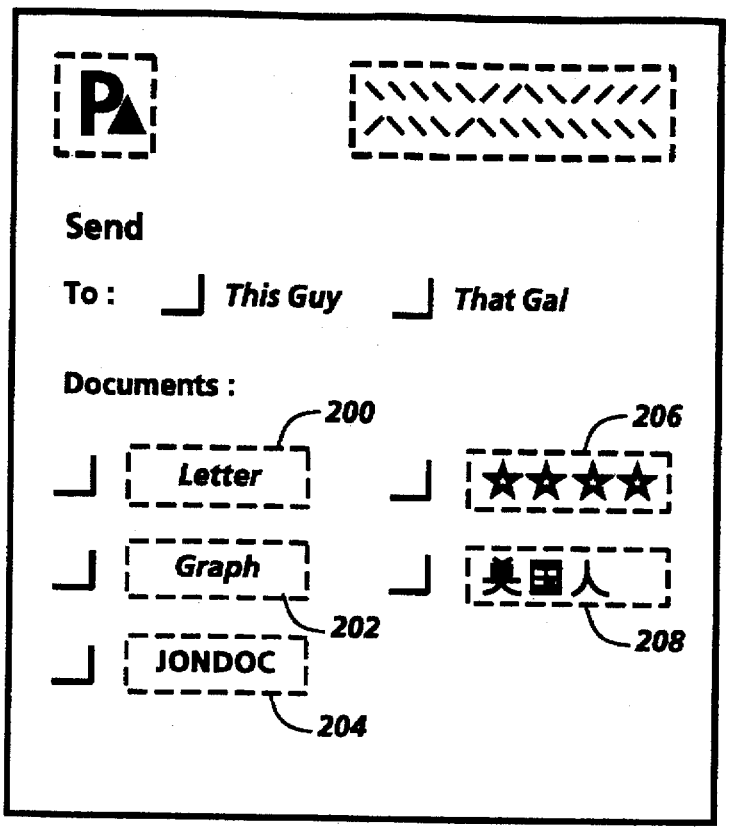
FIG. 12 is an illustration of a selection form relating to the send action generated in response to the request for a list of documents for sending according to one embodiment of the present invention.

One important feature of the send list generated by the list task is that it will present to the user the image domain label which was related to the document as detailed above. Again, the label may be of virtually any appropriate marking, and several examples are shown in FIG. 12. For example, labels 200 and 202 are handwritten character-based image labels, label 204 is a typewritten character-based image label (for example, in a text type recognizable by the computer), label 206 is a illustration-based image label, and label 208 is a non English language character based image label.

Figure 13:
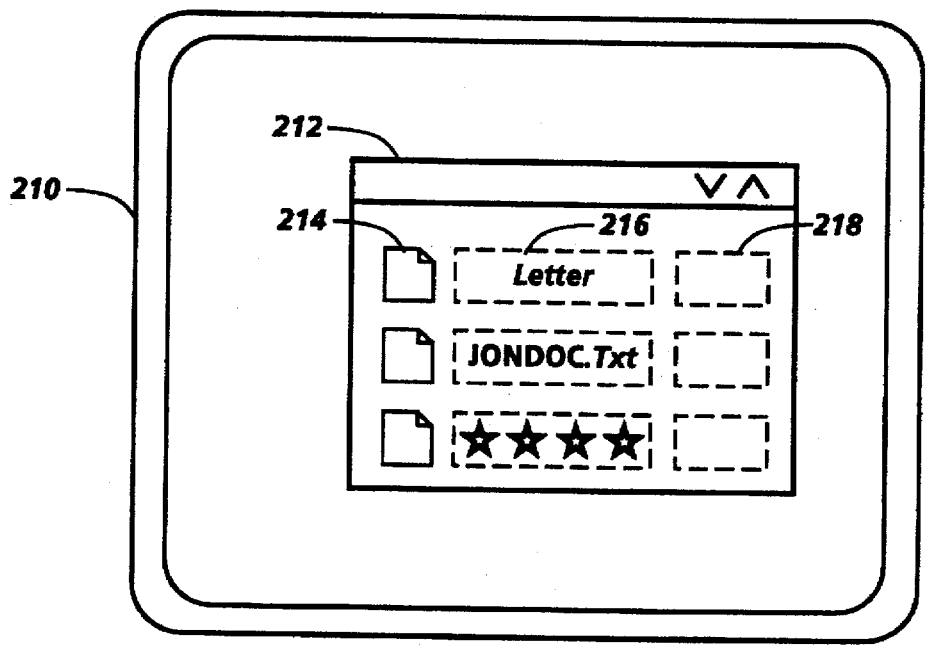
FIG. 13 is an illustration of a computer display screen displaying a list of image labels in a windowing user interface environment to facilitate document selection using an input device such as a mouse.

An alternative to invoking the send, retrieve, etc., actions by way of a form is to do so on a display, such as a CRT, of a computer. For example, suppose that the user has now returned from the distant location and has access to computer 54 on which has been stored one or more documents according to the above technique. The application software will facilitate obtaining a list of all or selected sets of the stored documents. A display screen 210 showing such a document list 212 in a windowing environment is illustrated in FIG. 13.

List 212 will include, for each listed item, an item type icon 214 (for example, a document icon, etc.), an image domain label 216, and other pertinent data 218 (for example, file size, creation date, etc.) when appropriate. As a precursor to constructing the document list 212, a table is constructed for managing the various file names, although this table is not displayed. When the document list 212 is initially requested, the information data base is examined to determine what files have been stored. The document entries of the information data base are examined, and the document file name and the file name of the related image label are entered into the table. This table is used to construct list 212 such that the file containing the image label is displayed, with a link to the related document. That is, at each row in the list an image label is displayed. A user's selection of a row will be interpreted to mean a selection of the document related to the image label displayed in that row.

The user interface such as Microsoft® Windows™ will have a particular protocol for identification (i.e., selection) of a displayed item. For example, clicking a button on a mouse input device is commonly interpreted as a selection of the region at which the pointer on the display screen is pointing. By way of standard interfacing with the user interface, it is possible to define what function selection of a particular displayed item will result in. For example, selection by double-clicking a mouse button is commonly defined as causing the selected file to be opened and displayed.

The applications software does not necessarily know whether the form it receives comes from a scanner, a fax machine, another computer, etc. Thus, one variation of the above involves providing a document to the computer for storing, sending, etc., from another computer. The document, which would be stored as a file on one computer, could be prefaced by an electronic form which the destination computer would interpret just as if the form and document were originally in paper form and were faxed to it as described above. One consequence of storing a document in this regime is that the document label will appear in the font of the computer on which the form was generated. However, the document label will be treated just as any other document label, and will not be stored in a computer recognizable form.

In general, to those skilled in the art to which this invention relates, many changes in construction and widely differing embodiments and applications of the present invention will suggest themselves without departing from its spirit and scope. For example, the present invention has been described in terms of remote document storage, manipulation and retrieval. However, it will be appreciated that the foregoing applies not only to documents, but to other types of data as well, such as the telephone dialing data described in U.S. patent application Ser. No. 07/856,107, now issued as U.S. Pat. No. 5,282,052, which is incorporated by reference herein. In addition, the foregoing has been from the perspective of assigning a name to a file. It will be appreciated that the same procedures would apply to establishing any other relationship between a reference item and an item to be referred to, for example a recipient's name and a recipient's telephone number however stored, as will be appreciated by one skilled in the art. Thus, the disclosures and descriptions herein are illustrative, and are not intended to be in any sense limiting.

When selecting the next action to be performed, the job scheduler may select one of 16 different types of action:

1. Input

This is the default action, and is executed when no other action is ready. It polls the application TSR to determine whether or not there is a newly received fax to be processed, and if so, enters a new batch in the database, and a new Batch action.

2. Batch

For a normal (image) fax transmission, this action creates, for each incoming page, a page entry in the database along with a Page action to be performed on that page, and a Job Set action. For a binary fax transmission, a job is created along with a Store Binary action. In both cases, a Cleanup action is also created.

3. Page

This action calls the image processing code to determine whether the page is blank (only if there is a single page in the batch), is a form, or is a data page. This determination is then stored in the database. For a form, the coded form data is also retrieved from the form image and stored in the database.

4. Job Set

This action is determined to be ready when there are no pages in the batch whose type remains unknown (i.e. when all corresponding Page actions are complete). Based on the sequence of forms and data pages, jobs are created in the database along with either a Form action (if the job has a form) or a Data action (if it does not) for each job.

5. Data

This action extracts the appropriate pages from the incoming fax transmission and creates an entry in the Information Database which corresponds to incoming fax mail.

6. Form

This action uses the coded form data from the form to find the form description file, then processes the form description to build data structures which are then passed to the image processing code. The image processing code determines which check boxes have been marked, and extracts any clip regions which have been used (e.g. a cover note). The results are then used to interpret the instructions on the form and create various actions and other data structures within the database.

7. Pre-Send

This action converts any files requested for send to the file format native to the fax card in use on this particular system. It also processes all the requested recipients and creates a Send action for each of those.

8. Send

This action queues all the requested files and submits a request to the application TSR to send them to the specified recipient. It also creates a corresponding Verify action.

9. Store

This action extracts any data pages associated with the job and creates a corresponding entry in the Information Database. It also adds the new virtual file to any categories which were specified on the form.

10. Store Binary

This action creates an entry in the Information Database for an incoming binary file, and marks this as incoming fax mail.

11. Pre-Retrieve

This action converts any files requested for retrieve to the file format native to the fax card in use on this particular system. It also creates a Retrieve action.

12. Retrieve

This action queues all the requested files and submits a request to the application TSR to send them to the return address. It also creates a corresponding Verify action.

13. Delete

This action deletes any files (from both the Information Database and the disk) for which deletion was indicated on the form.

14. Verify

This action requests the status of its corresponding Send or Retrieve event from the application TSR, in order to verify its completion or failure. If the event has not yet completed, the action resets its start time so that it will verify later.

15. Cleanup

This action runs after all other actions associated with a batch are complete. It tidies up after all the other actions by deleting any temporary files.

16. Purge

This action is independent of any batch. It runs periodically, as specified by the user, and deletes old unwanted information from the database.

What is claimed is:

1. An image processing system, comprising:
   a processor;
   memory, connected to said processor, containing a data item;
   conversion circuitry, connected to said processor, for converting a printed document into a file of data representing the printed document;
   image processing software under control of which the processor extracts data representing selected indications imparted on the printed document from the file; and
   relationship establishing software under control of which the processor establishes a relationship between the data representing selected indications imparted on the printed document and the data item such that selection of the data representing selected indications imparted on the printed document will be interpreted as selection of the data item.

2. The image processing system of claim 1, wherein the selected indications imparted on the printed document include at least an arbitrary, image domain file label.

3. The image processing system of claim 2, wherein the arbitrary, image domain file label is a user imparted handwritten file label.

4. The image processing system of claim 2, wherein the data item includes a data representation of a second document, and the arbitrary, image domain file label is a document label for the second document.

5. The image processing system of claim 4, wherein the arbitrary, image domain document label is a user imparted handwritten document label.

6. The image processing system of claim 1, further including listing software under control of which the processor generates, upon request, a listing that includes an image of the indications represented by the data representing selected indications imparted on the printed document, such that selection of the image from the listing is interpreted by the processor as a selection of the data item in accordance with the established relationship between the data representing selected indications imparted on the printed document and the data item.

7. The image processing system of claim 6, wherein the processor under control of the listing software generates a printed listing that includes an image of the indications represented by the data representing selected indications imparted on the printed document, such that selection of the image from the printed listing is interpreted by the processor as a selection of the data item in accordance with the established relationship between the data representing selected indications imparted on the printed document and the data item.

8. A document storage, manipulation and retrieval system, comprising:
   a processor;
   memory connected to the processor such that the processor may store and retrieve electronic data therefrom;
   document imaging circuitry connected to the processor, for acquiring images of printed documents and converting an acquired image of a document into a data representation of the document;
   image processing software under control of which the processor identifies at least one selected region of a document from the data representation of the document;
   a software product communicationally connected to said processor under control of which the processor assigns a first file name to a first file containing a data representation of a first document acquired by said document imaging circuitry, assigns a second file name to a second file containing data representing a selected region of a second document identified by the processor under control of the image processing software from a data representation of the second document acquired by said document imaging circuitry, and establishes a relationship between the first and second file names such that identification of the contents of the second file may be interpreted by the processor as identification of the contents of the first file.

9. The system of claim 8, wherein the selected region of the second document identified by the processor under control of the image processing software contains an arbitrary, image domain document label.

10. The system of claim 9, wherein the arbitrary, image domain document label is a user imparted, handwritten image document label.

11. The system of claim 8, wherein the processor under control of the software product further establishes a relationship between the contents of the first and second files such that identification of the contents of the first file may be interpreted by the processor as identification of the contents of the second file.

12. A method comprising:
   storing a data file in a data processing system;
   obtaining and storing label data defining a label image;
   the label image identifying the stored data file to a user;

obtaining associating data that associate the data file stored in the data processing system and the label data so that the stored data file can be accessed in the data processing system in response to a signal selecting the label image;

using the label data to present the label image to a user so that the user can provide a signal selecting the label image;

receiving the signal selecting the label image from the user; and in response to the signal selecting the label image, accessing the stored data file.

13. The method of claim 12 in which the act of obtaining and storing label data comprises:

receiving data representing an image of a form that shows the label image; and using the data representing an image of a form to obtain the label data.

14. The method of claim 13 in which the image of the form shows a field that the user has marked with a handwritten file label.

15. The method of claim 14 in which the image of the form includes an encoded identifier of the form; the act of using the data representing an image of a form to obtain the label data comprising:

decoding the encoded identifier of the form to obtain a form identifier; and using the form identifier to obtain the label data.

16. The method of claim 12 in which the act of obtaining and storing label data comprises:

receiving data representing the label image from a facsimile machine; and using the data representing the label image to obtain the label data.

17. The method of claim 12 in which the act of obtaining associating data comprises:

obtaining a data structure that associates the data file stored in the data processing system and the label data so that the stored data file can be accessed in the data processing system in response to a signal selecting the label image; the associating data including the data structure.

18. The method of claim 12 in which the act of obtaining associating data comprises:

obtaining a first file name for the stored data item and a second file name for the label data; and using the first and second file names to obtain the associating data.

19. The method of claim 18 in which the act of using the first and second file names comprises obtaining a link between the first and second file names.

20. The method of claim 12 in which the act of using the label data to present the label image comprises:

using the label data to obtain form data representing a form that shows the label image in a field that can be marked to select the label image; and providing the form data to printing circuitry;

the act of receiving the signal selecting the label image comprising:

receiving data representing an image of the form that shows a mark in the field selecting the label image.

21. The method of claim 12 in which the act of using the label data to present the label image comprises:

using the label data to obtain display data representing a display image that includes the label image so that the user can use an input device to provide a signal selecting the label image; and providing the display data to a display for presentation to the user;

the act of receiving the signal selecting the label image comprising:

receiving a signal from the input device selecting the label image.

22. The method of claim 12 in which the act of receiving the signal selecting the label image comprises:

receiving a request for a processing task;

the act of accessing the stored data file comprising:

performing the requested processing task on the stored data file.

23. The method of claim 22 in which the stored data file represents a document; the act of receiving a request for a processing task comprising:

receiving a request to transmit the document to a destination;

the act of performing the requested processing task comprising:

using the stored data file to obtain data representing the document; and transmitting the data representing the document to the destination.

24. A method comprising:

storing a data file in a data processing system;

obtaining data representing an image of a form; the form showing a user modifiable field that has been modified to show a label image that identifies the stored data file to a user;

using the data representing the image of the form to obtain label data defining the label image and storing the label data;

obtaining associating data that associate the data file stored in the data processing system and the label data so that the stored data file can be accessed in the data processing system in response to a signal from a user selecting the label image;

using the label data to present the label image to the user so that the user can provide a signal selecting the label image;

receiving the signal selecting the label image from the user; and in response to the signal selecting the label image, accessing the stored data file.

25. The method of claim 24 in which the data file represents an image of a document; the user modifiable field having been marked by a user with handwriting; the handwriting forming a label image within the user modifiable field; the label image having an appearance from which the user can identify the document; the act of using the data representing the image of the form comprising:

performing a clipping operation on the data representing an image of the form to obtain the label data; the clipping operation clipping the contents of the user modifiable field;

for each location in the label image, the label data including a data item indicating a color for the location.

* * * * *